United States Patent
Kamble et al.

(10) Patent No.: US 9,661,005 B2
(45) Date of Patent: May 23, 2017

(54) SECURITY LEVEL AND STATUS EXCHANGE BETWEEN TCP/UDP CLIENT(S) AND SERVER(S) FOR SECURE TRANSACTIONS

(71) Applicant: International Business Machines Corporation, Armonk, NY (US)

(72) Inventors: Keshav G. Kamble, Fremont, CA (US); Vijoy A. Pandey, San Jose, CA (US); Vaishali V. Pandya, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 100 days.

(21) Appl. No.: 14/151,537

(22) Filed: Jan. 9, 2014

(65) Prior Publication Data
US 2015/0195293 A1      Jul. 9, 2015

(51) Int. Cl.
*H04L 29/06* (2006.01)
*H04L 29/08* (2006.01)

(52) U.S. Cl.
CPC .......... *H04L 63/1408* (2013.01); *H04L 69/16* (2013.01)

(58) Field of Classification Search
CPC .... H04L 67/141; H04L 63/1408; H04L 63/16
USPC .......................................................... 726/22
See application file for complete search history.

(56) References Cited

U.S. PATENT DOCUMENTS

| | | | |
|---|---|---|---|
| 7,930,750 B1* | 4/2011 | Gauvin | H04L 63/1416 709/223 |
| 8,365,273 B2 | 1/2013 | Kivinen et al. | |
| 8,438,629 B2 | 5/2013 | Lee et al. | |
| 8,458,453 B1 | 6/2013 | Mahalingaiah | |
| 2006/0129817 A1* | 6/2006 | Borneman | G06F 21/41 713/170 |
| 2006/0294241 A1* | 12/2006 | Cherian | H04L 67/14 709/227 |

(Continued)

OTHER PUBLICATIONS

Pichumani et al., "On Implementing Security at the Transport Layer," 3rd International Conference on Communication Systems Software and Middleware and Workshops, 2008, COMSWARE 2008, IEEE, 2008, pp. 318-326.

(Continued)

*Primary Examiner* — William Powers
*Assistant Examiner* — Aubrey Wyszynski
(74) *Attorney, Agent, or Firm* — Zilka-Kotab, PC

(57) ABSTRACT

According to one embodiment, a system includes a processor and logic integrated with and/or executable by the processor, the logic being configured to identify a security issue affecting a first peer in one or more secure transmission control protocol/user datagram protocol (TCR/UDP) sessions, inform a second peer about the security issue using the first peer of the one or more TCP/UDP sessions, and perform at least one action in response to identifying and/or being informed about the security issue. In another embodiment, a method for providing a secure TCP/UDP session includes identifying a security issue affecting a first peer in one or more TCP/UDP sessions, informing a second peer about the security issue using the first peer of the one or more TCP/UDP sessions, and performing at least one action in response to identifying and/or being informed about the security issue.

20 Claims, 10 Drawing Sheets

(56) References Cited

U.S. PATENT DOCUMENTS

2011/0016314 A1    1/2011  Hu et al.
2015/0067027 A1*  3/2015  Liu ..................... H04L 67/1027
                                                        709/203

OTHER PUBLICATIONS

Wang et al., "CoAP Option Extensions: Profile and Sec-flag," Internet-Draft, Oct. 2012, pp. 1-12.
Kamble et al., U.S. Appl. No. 15/414,501, filed Jan. 24, 2017.

* cited by examiner

| Bit Offset | Bits 0-3 | Bits 4-7 | Bits 8-15 | Bits 16-31 |
|---|---|---|---|---|
| 0 | | | Source Port 602 | Destination Port 604 |
| 32 | | | Sequence Number 606 | |
| 64 | | | Acknowledgement Number 608 | |
| 96 | Data Offset 610 | Reserve 612 | | Window 614 |
| 128 | | | Checksum 616 | Urgent Pointer 618 |
| 160 | | | Options (Optional) 620 | |
| 160/192+ | | | Data 622 | |

| Remaining Reserve | SEC 626 | SAC 628 | CWR 630 | ECE 632 | URG 634 | ACK 636 | PSH 638 | RST 640 | SYN 642 | FIN 644 |
|---|---|---|---|---|---|---|---|---|---|---|

SECURITY LEVEL AND STATUS EXCHANGE BETWEEN TCP/UDP CLIENT(S) AND SERVER(S) FOR SECURE TRANSACTIONS

BACKGROUND

The present invention relates to data center infrastructure and usage, and more particularly, this invention relates to exchanging security level and status information between transmission control protocol/user datagram protocol (TCP/UDP) client(s) and server(s) to provide secure transactions.

Multiple TCP/UDP sessions may be established between one or more clients and one or more servers to exchange confidential data over sockets of the devices. Servers and/or clients are usually exposed to viruses and/or malware, which may lead to virus infections and/or malware and/or spyware attacks which appropriate information from the devices which are affected/infected.

TCP/UDP sessions which are exchanging confidential information with such affected/infected devices (or devices which are infected by other sessions while secure sessions are exchanging information), are completely unaware of device security status or concerns over virus, malware, or spyware attacks.

Transport protocols are not aware of the security level of devices while a session is in progress. Also, transport protocols are not adaptive nor capable of adjusting the information exchange according to security exposure/levels of peers in the session.

Accordingly, TCP/UDP sessions are vulnerable to virus/malware/spyware attacks, which may result in the exposure of confidential information.

SUMMARY

According to one embodiment, a system includes a processor and logic integrated with and/or executable by the processor, the logic being configured to identify a security issue affecting a first peer in one or more secure transmission control protocol/user datagram protocol (TCP/UDP) sessions, inform a second peer about the security issue using the first peer of the one or more TCP/UDP sessions, and perform at least one action in response to identifying and/or being informed about the security issue.

In another embodiment, a method for providing a secure TCP/UDP session includes identifying a security issue affecting a first peer in one or more TCP/UDP sessions, informing a second peer about the security issue using the first peer of the one or more TCP/UDP sessions, and performing at least one action in response to identifying and/or being informed about the security issue.

In yet another embodiment, a computer program product for providing a secure TCP/UDP session includes a computer readable storage medium having program code embodied therewith, the program code readable/executable by a processor to identify a security issue affecting a first peer in one or more TCP/UDP sessions, inform a second peer about the security issue using the first peer by sending a packet from the first peer to the second peer, the packet including an indication of the security issue in a TCP header of the packet, and perform at least one action to resolve and/or avoid the security issue in response to identifying and/or being informed about the security issue at the first peer and/or the second peer.

Other aspects and embodiments of the present invention will become apparent from the following detailed description, which, when taken in conjunction with the drawings, illustrate by way of example the principles of the invention.

BRIEF DESCRIPTION OF THE SEVERAL VIEWS OF THE DRAWINGS

FIG. 6A shows a transmission control protocol (TCP) header according to one embodiment.

FIG. 6B shows a reserve field of the TCP header according to one embodiment.

DETAILED DESCRIPTION

Figure 1:
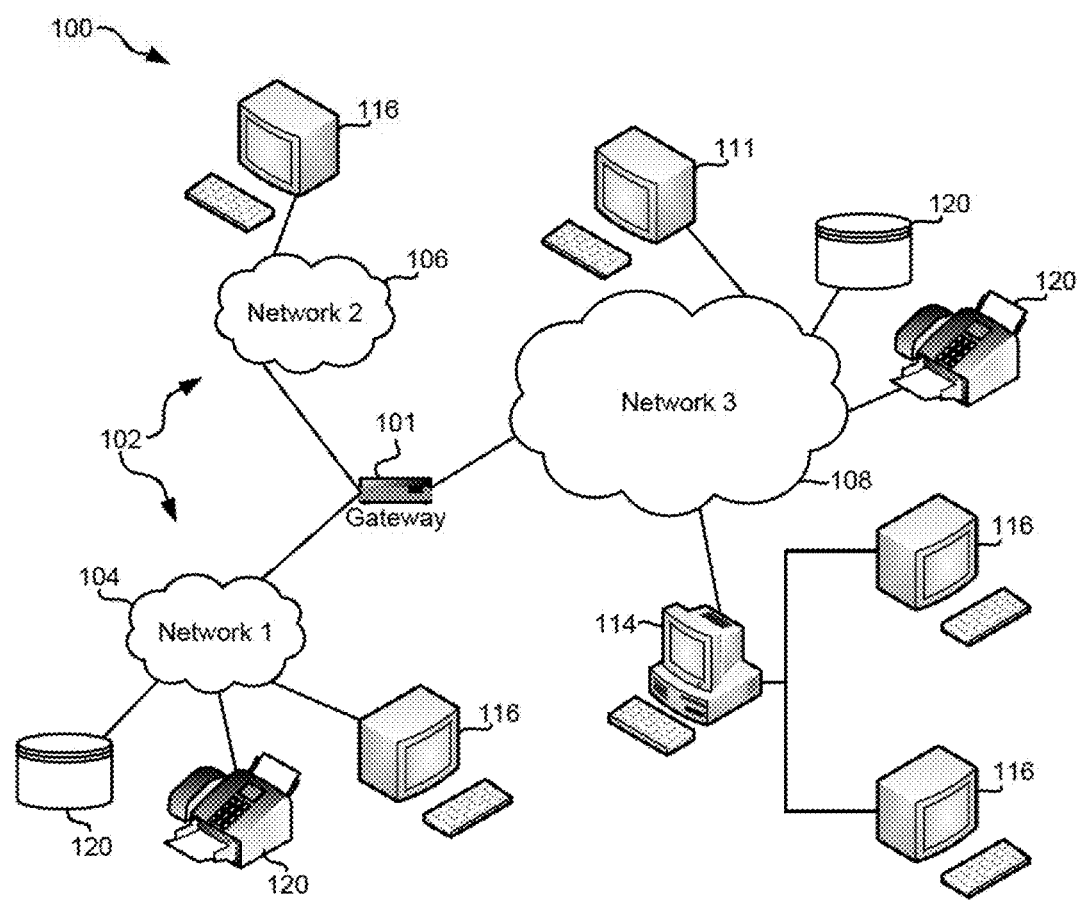
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries treatises, etc.

It must also be noted that, as used in the specification and the appended claims, the singular forms "a," "an," and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Furthermore, "about" as used herein as a relative term includes any amount reasonably close to the value being modified by the term "about." In one embodiment, ±5% of the value which is modified by about is included. For example, "about 10" may include 9.5, 10.5, and all values therebetween.

According to one general embodiment, a system includes a processor and logic integrated with and/or executable by the processor, the logic being configured to identify a security issue affecting a first peer in one or more secure transmission control protocol/user datagram protocol (TCP/UDP) sessions, inform a second peer about the security issue using the first peer of the one or more TCP/UDP sessions, and perform at least one action in response to identifying and/or being informed about the security issue.

In another general embodiment, a method for providing a secure TCP/UDP session includes identifying a security issue affecting a first peer in one or more TCP/UDP sessions, informing a second peer about the security issue using the first peer of the one or lore TCP/UDP sessions, and performing at least one action in response to identifying and/or being informed about the security issue.

In yet another general embodiment, a computer program product for providing a secure TCP/UDP session includes a computer readable storage medium having program code embodied therewith, the program code readable/executable by a processor to identify a security issue affecting a first peer in one of more TCP/UDP sessions, inform a second peer about the security issue using the first peer by sending a packet from the first peer to the second peer, the packet including an indication of the security issue in a TCP header of the packet, and perform at least one action to resolve and/or avoid the security issue in response to identifying and/or being informed about the security issue at the first peer and/or the second peer.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in conjunction with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer of entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic, software logic such as firmware, operating system, etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), etc.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing, access and distribution of services across many computing systems. Cloud computing typically involves an Internet connection between the systems operating in the cloud, but other techniques of connecting the systems may also be used.

Figure 2:
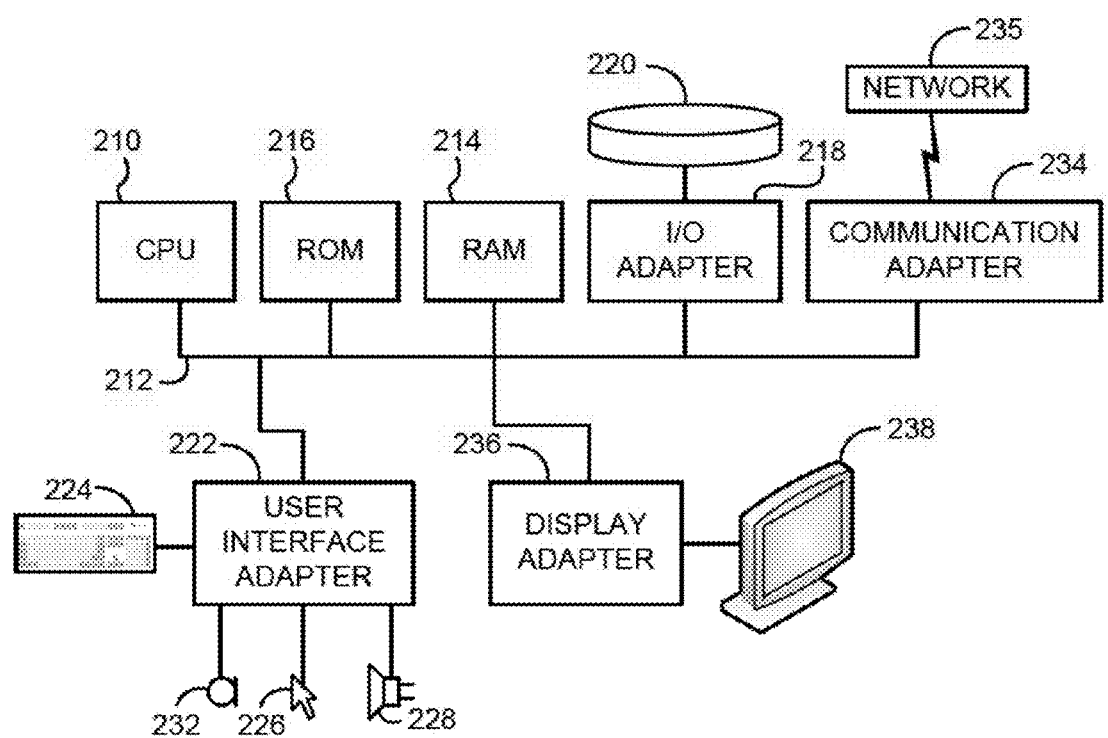
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming, methodology. Object oriented programming (OOP), which has become increasingly used to develop complex applications, may be used.

Figure 3:
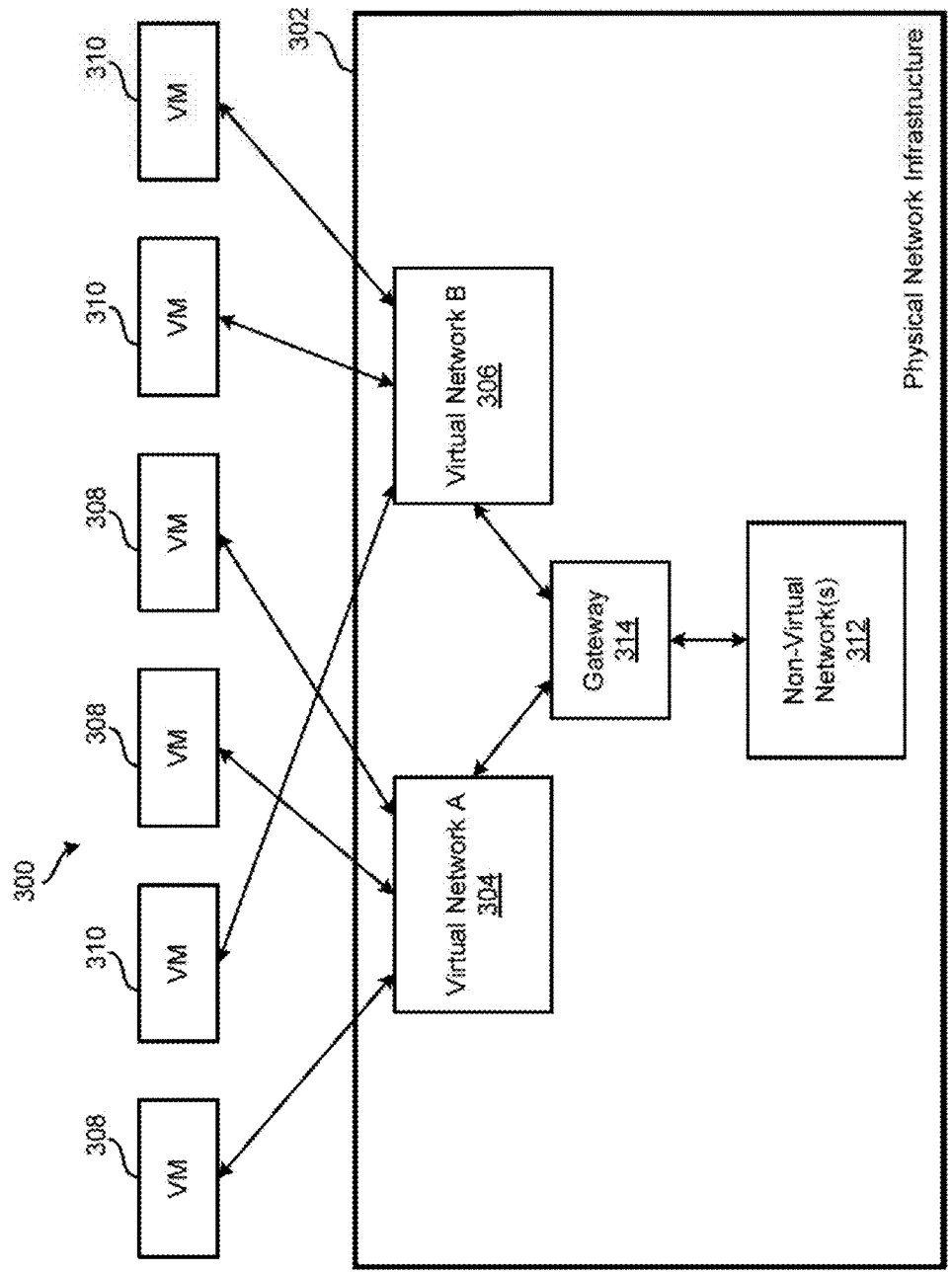
FIG. 3 is a simplified diagram of a virtualized data center, according to one embodiment.

Referring now to FIG. 3, a conceptual view of an overlay network 300 is shown according to one embodiment. The overlay network may utilize any overlay technology, standard, or protocol, such as a Virtual eXtensible Local Area Network (VXLAN), Distributed Overlay Virtual Ethernet (DOVE), Network Virtualization using Generic Routing Encapsulation (NVGRE), etc.

In order to virtualize network services, other than simply providing a fabric communication path (connectivity) between devices, services may be rendered on packets as they move through the gateway 314 which provides routing and forwarding for packets moving between the non-virtual network(s) 312 and the Virtual Network A 304 and Virtual Network B 306. The one or more virtual networks 304, 306 exist within a physical (real) network infrastructure 302. The network infrastructure 302 may include any components, hardware, software, and/or functionality typically associated with and/or used in a network infrastructure, including, but not limited to, switches, connectors, wires, circuits, cables, servers, hosts, storage media, operating systems, applications, ports, I/O, etc., as would be known by one of skill in the art. This network infrastructure 302 supports at least one non-virtual network 312, which may be a legacy network.

Each virtual network 304, 306 may use any number of virtual machines (VMs) 308, 310. In one embodiment, Virtual Network A 304 includes one or more VMs 308, and Virtual Network B 306 includes one or more VMs 310. As shown in FIG. 3, the VMs 308, 310 are not shared by the virtual networks 304, 306, but instead are exclusively included in only one virtual network 304, 306 at any given time.

According to one embodiment, the overlay network 300 may include one or more cell switched domain scalable fabric components (SFCs) interconnected with one or more distributed line cards (DLCs).

By having a "flat switch" architecture, the plurality of VMs may move data across the architecture easily and efficiently. It is very difficult for VMs, generally, to move across Layer-3 (L3) domains, between one subnet to another subnet, internet protocol (IP) subnet to IP subnet, etc. But if it the architecture is similar to a large flat switch, in a very large Layer-2 (L2) domain, then the VMs are aided in their attempt to move data across the architecture.

Figure 4:
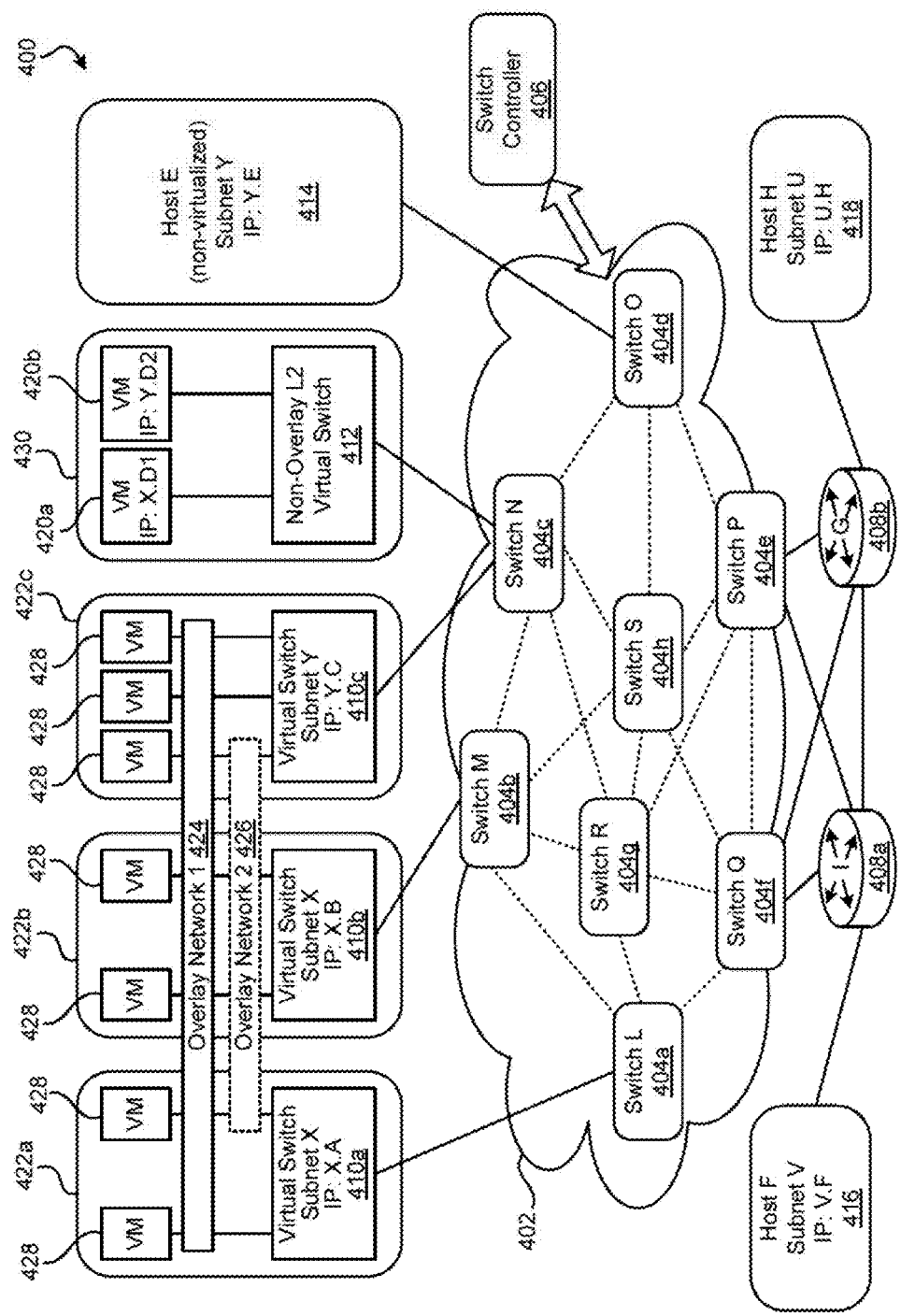
FIG. 4 is a simplified diagram of a network (SDN) switch cluster operating as a distributed router, according to one embodiment.

FIG. 4 shows a simplified topological diagram of a SDN system 400 or network having a switch cluster 402 operating as a distributed router, according to one embodiment. The switch cluster 402 comprises a plurality of switches 404a, 404b, . . . , 404n, each switch being connected in the cluster. The switches that are explicitly shown (Switch L 404a, Switch M 404b, Switch N 404c. Switch O 404d, Switch P 404e, Switch Q 404f, Switch R 404g, Switch S 404h) are for exemplary purposes only, as more or less switches than those explicitly shown may be present in the switch cluster 402. An L3 aware switch controller 406, such as an SDN controller, is connected to each switch 404a, 404b, ..., 404n in the switch cluster 402, either directly or via one or more additional connections and/or devices. Additionally, some switches 404a, 404b, ..., 404n are connected to one or more other virtual or physical devices external to the switch cluster 402. For example, Switch L 404a is connected to vSwitch 410a, Switch Q 404f is connected to Router I 408a, Switch N 404c is connected to non-overlay L2 vSwitch 412 and vSwitch 410c, etc. Of course, these connections are for exemplary purposes only, and any arrangement of connections, number of switches in the switch cluster 402, and any other details about the system 400 may be adapted to suit the needs of whichever installation it is to be used in, as would be understood by one of skill in the art.

The system 400 also has several devices outside of the switch cluster 402, such as Host F 416 which is connected to the switch cluster 402 via Router I 408a, Host H 418 which is connected to the switch cluster 402 via Router G 408b, Host E 414 which is connected to the switch cluster 402 via Switch O 404d, etc. Also capable of being connected to the switch cluster 402 is a non-overlay L2 virtual switch 412 that is supported by a physical server 430. This server may also host VMs 420a and 420b, which have their own IP addresses.

Three servers 422a, 422b, 422c are shown hosting a plurality of VMs 428, each server having a virtualization platform or hypervisor (such as Hyper-V, KVM, Virtual Box, VMware Workstation, etc.) which hosts the VMs 428 and a vSwitch 410a, 410b, 410c, respectively. In addition, the hosted VMs 428 on the various servers 422a, 422b, 422c may be included in one or lore overlay networks, such as Overlay networks 1 or 2 (424 or 426, respectively). How the VMs 428 are divided amongst the overlay networks is a design consideration that may be chosen upon implementing the system 400 and adjusting according to needs and desires.

The number of various devices (e.g., Router (ii 408b, server 422a, Host E 414, etc.) connected to the switch cluster 402 are for exemplary purposes only, and not limiting on the number of devices which may be connected to a switch cluster 402.

Each device in the system 400, whether implemented as a physical or a virtual device, and regardless of whether it is implemented in hardware, software, or combination thereof, is described as having, an internet protocol (IP) address. Due to limited space, the routers 408a, 408b do not have their IP addresses or subnet information shown. However, Router I 408a is in Subnet W, and has a router address of W.I, while Router G 408b is in Subnet Z and has a router address of Z.G.

Some of the embodiments and approaches described herein may be used in the context of a SDN system 400 as shown in FIG. 4.

Figure 5A:
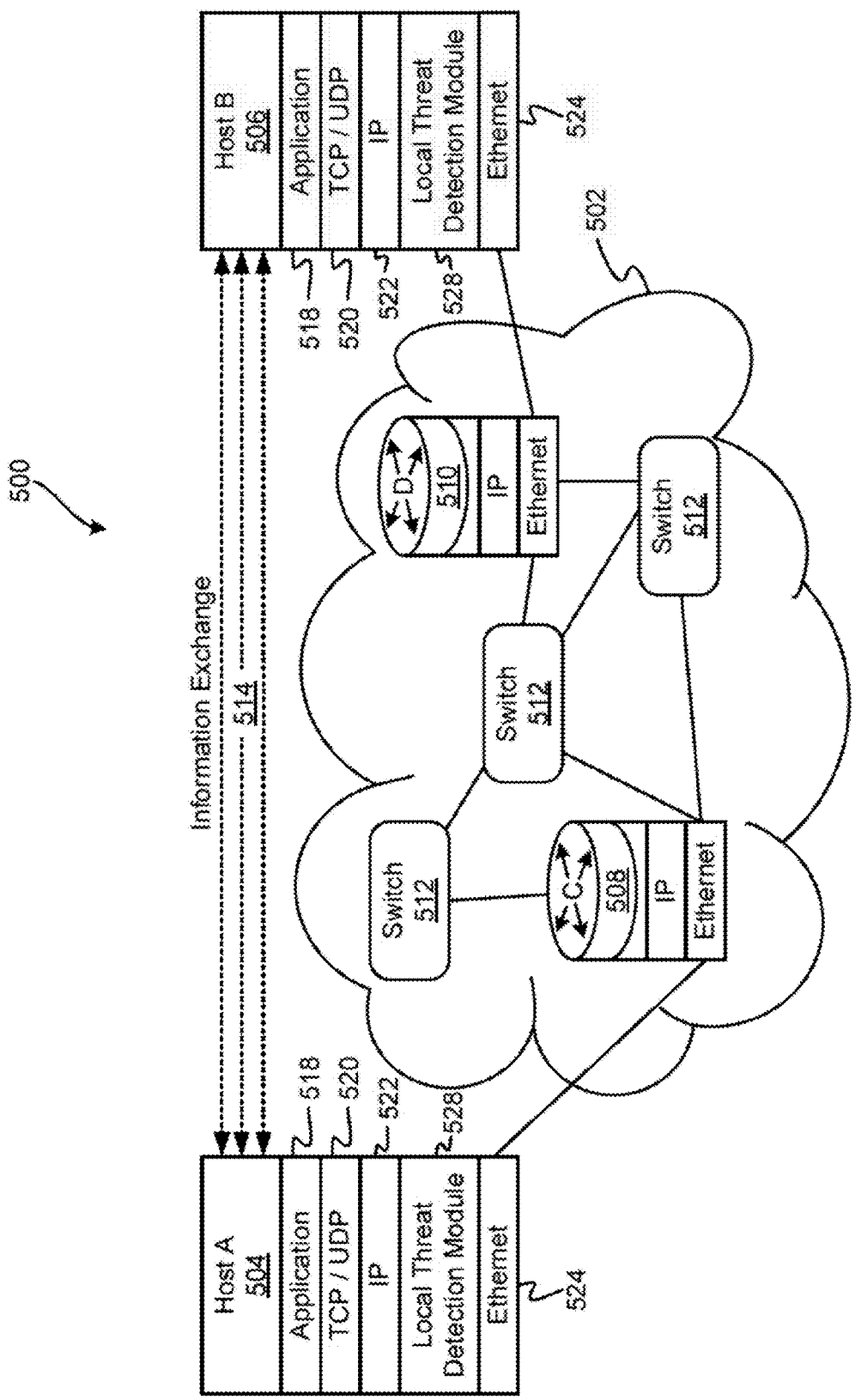
FIGS. 5A-5D show several simplified diagrams of a system having two hosts connected via a network, according to various embodiments.

Now referring to FIG. 5A, a system 500 is shown having two hosts, Host A 504 and Host B 506, connected through a network 502. Either of the hosts 504, 506 may be a client, a server, or some other entity in a communication arrangement, as would be understood by one of skill in the art. Each host 504, 506 includes at least an application layer 518, a TCP/UDP stack 520, an IP stack 522, and an Ethernet stack 524, as known in the art. The application layer 518 is configured for allowing any number of applications to execute, operate, or otherwise run on the particular device supporting the application layer 518.

The local threat detection module 528 is accessible by the local TCP/UDP layers 520 on the hosts (Host A 504, Host B 506) via interfaces to the local threat detection module 528 to communicate and receive threat level and/or security status information. This security status may be used by these protocols to inform the peers on a per-session basis, and/or for any other purpose determined useful in alleviating threats.

The network 502 may include any number of components used in networking communications, such as routers 508, 510, switches 512, servers, etc. As shown, the network 502 includes two routers, Router C 508 and Router D 510, which are connected to one another via a plurality of switches 512. Router C 508 is also connected to Host A 504, while Router D 510 is connected to Host B 506. Of course, more or less virtual or physical components, virtual or physical devices, applications, virtual or physical appliances, etc., may be included in the network 502 and/or within or external to either of the hosts 504, 506, as would be understood by one of skill in the art upon reading the present descriptions.

In the system 500 shown in FIG. 5A, multiple TCP/UDP sessions 514 may be established between a client (e.g., Host A 504) and a server (e.g., Host B 506) to exchange information, which may include confidential data, over TCP/UDP sockets of the client and server (e.g., Host A 504 and Host B 506). These TCP/UDP sessions 514, in one embodiment, may be configured for operation with Random Early Detection (RED)/Explicit Congestion Notification (ECN), in which case an IP ECN bit is set according to congestion detected in the network 502, as would be understood by one of skill in the art versed in operation of RED/ECN networks.

During this exchange of information, the server and/or client Host A 504 and/or Host B 506) may be exposed to some type or form of virus, malware, and/or spyware attacks which may attempt to confiscate, steal, appropriate, or otherwise obtain the information being exchanged over the TCP/UDP sessions 514.

TCP/UDP sessions 514 which are exchanging confidential information with a server and/or a client (e.g., Host A 504 and/or Host B 506) which is infected by the virus, malware, and/or spyware attack (or infected by some other session, such as another TCR/UDP session, while the secure TCP/UDP sessions 514 were exchanging information), are completely unaware of a security status of the other server and/or the other client (e.g., Host A 504 is unaware of the security status of Host B 506, and Host B 506 is unaware of the security status of Host A 504).

This is because transport protocols, such as TCP, UDP, etc., are not configured to be aware of a security status (or security level or security warning) that may be issued by any devices in a TCP/UDP session 514 while the TCP/UDP session 514 is in progress. Furthermore, transport protocols are not adaptive and not configured to adjust the information exchange between peers in the TCP/UDP session 514 according to security exposure/levels of peers in the secure TCP/UDP session 514. However, a local TCP/UDP stack 520 of any device is typically able to identify security issues on the device supporting the local TCP/UDP stack 520. This information is typically not available to other devices external to the device supporting the local TCP/UDP stack 520.

Therefore, in order to resolve this limitation of TCP/UDP sessions 514 and security information distribution, it is useful to have a mechanism that is configured to receive the local security status from a local security threat detection program and transmit security information from one host or server to another host or server that are peers in one or more TCP/UDP sessions in progress 514 (e.g., Host A 504 and Host B 506) so that both devices are made aware of the security issue.

Figure 5B:
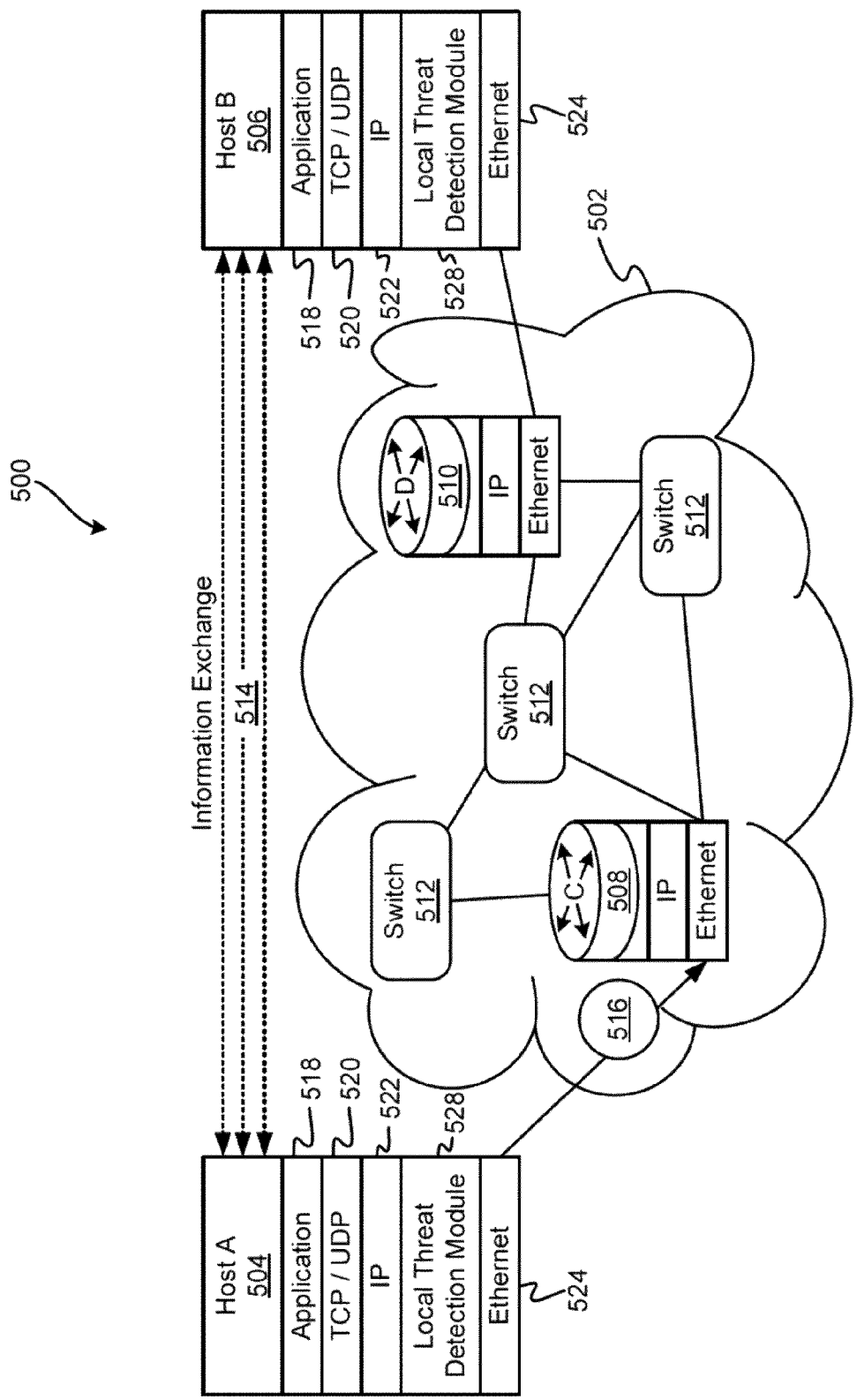

As shown FIG. 5B, in a TCP/UDP control session 514, according to one embodiment, Host A 504 may send a packet 516 to Router C 508 during normal communications therewith or a special packet designed to indicate a security issue, which may have been detected rising the local threat detection module 528 or otherwise determined. The packet 516, according to one embodiment, includes an application header (App Hdr), TCP Header (TCP Hdr), an IP Header (IP Hdr), and an Ethernet Header (Eth Hdr). The TCP header is shown in more detail in FIGS. 64-6B.

Figure 5C:
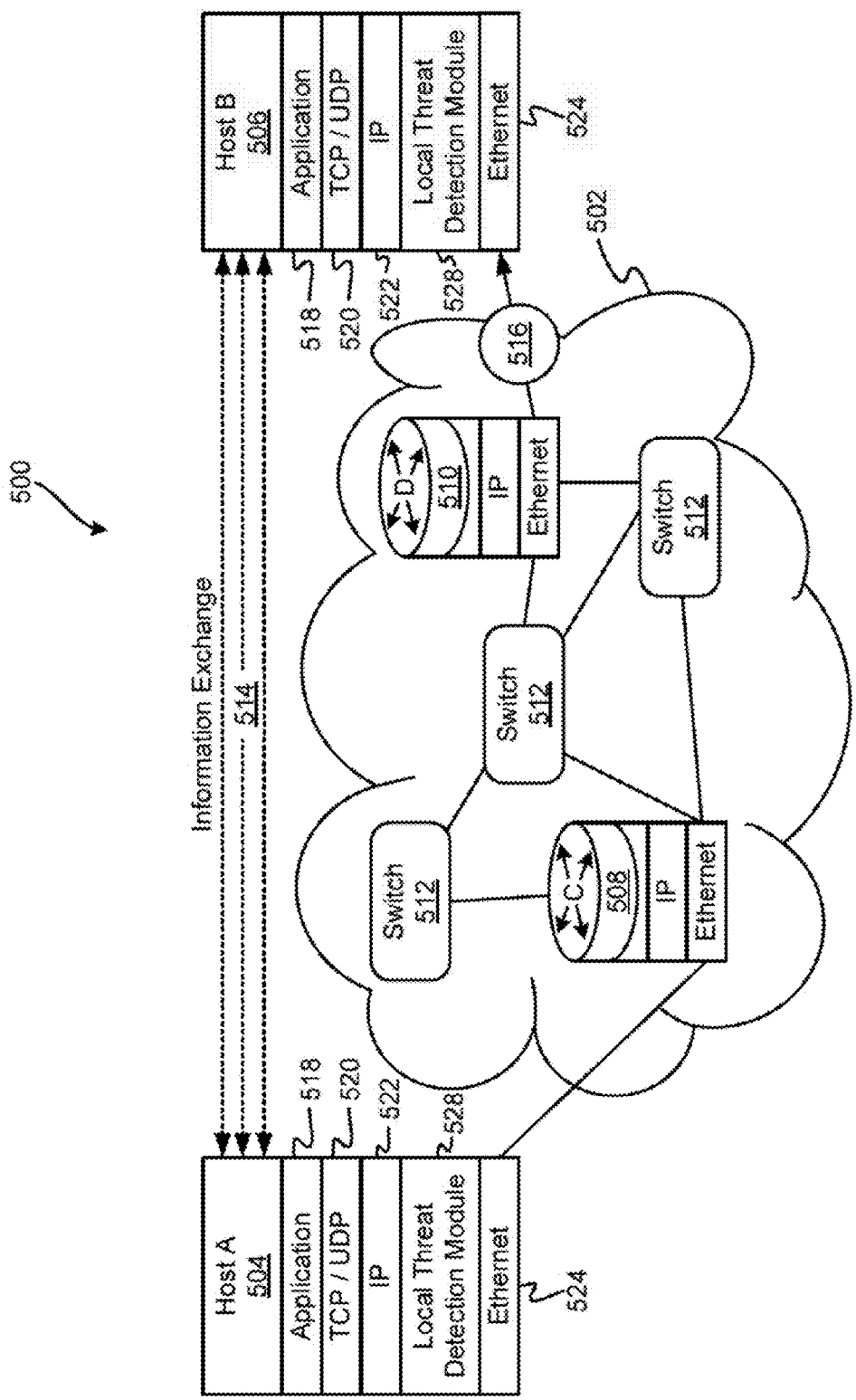

Referring, again to FIG. 5B, Router C 508 forwards the packet 516 via any of the switches 512 to Router D 510, which then forwards the packet to Host B 506, as shown in FIG. 5C. The IP stack 522 of Host B 506 forwards some or all of the packet 516 to the TCP/UDP stack 520, where a security flag is checked (SEC flag or bit), which is stored in the TCP header of the packet 516. If the security flag indicates a security issue (such as a security warning, security breach, etc.), which may be indicated by the security flag bit being flipped (1 instead of 0, or vice versa), the TCP/UDP stack 520 of Host B 506 is made aware that a security issue exists on Host A 504 and/or across the TCP/UDP session(s) 514. In response to the severity of the security issue on Host A 504 and/or across the TCP/UDP session(s) 514, one or more security adjustment levels and informs the application(s) operating via the one or more TCP/UDP sessions 514 to limit information exchange based on the security level indicated. This instruction may be delivered to the application layer via a socket call, extension of socket call, or some other technique known in the art.

Also, in one embodiment, Host B 506 may inform the peer device (e.g., Host A 504) that the packet 516 was received indicating the security issue by sending a return packet 526 back to Host A 504 via the network 502. The return packet 526 includes an indication that the security level adjustment has taken place, such as by indicating acknowledgement of the security issue in a TCP header of the return packet 526. In one embodiment, a security acknowledgment flag (SAC flag or bit) may be set in the TCP header of the return packet 526 which is returned/forwarded/sent to Host A 504.

In response to receiving the packet 516 indicating a security issue (e.g., via having the SEC bit flipped), one or more of the applications at Host B 506 may act in any number of ways known in the art, such as by doing nothing in response to a minor security issue or security alert, trying to resolve the security issue, limit exchange of information via the TCP/UDP sessions 514, limit exchange of information with Host A 504, etc.

Figure 5D:
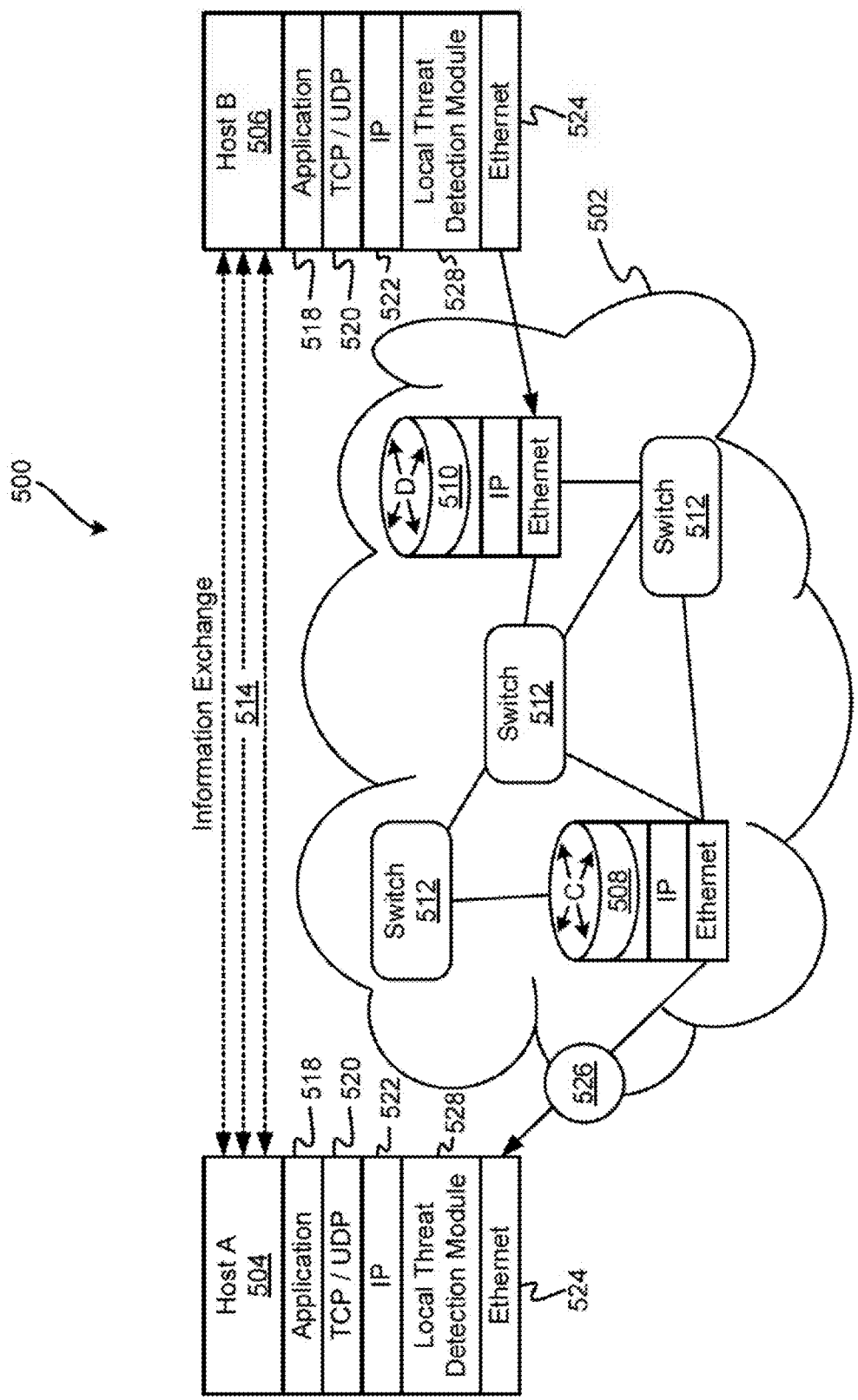

Now referring to FIG. 6A, a TCP header 600 format is shown according to one embodiment. This TCP header 600 may be used in FIGS. 5C-5D in the packet 516 to indicate the security issue or the return packet 526 to acknowledge receipt of the packet 516, according to various embodiments.

Referring again to FIG. 6A, the TCP header 600 includes, according to one embodiment, a source port 602 in bits 0-15 with a hit offset of 0, a destination port 604 in bits 16-31 with a bit offset of 0, a sequence number 606 in bits 0-31 with a bit offset of 32, an acknowledgement number 608 in bits 0-31 with a bit offset of 64, a data offset 610 in bits 0-3 with a bit offset of 96, a reserve field 612 in hits 4-15 with a bit offset of 96, a window 614 in bits 16-31 with a bit offset of 96, a checksum 616 in bits 0-15 with a bit offset of 128, an urgent pointer 618 in bits 16-31 with a bit offset of 128, an options field 620 in bits 0-31 with a bit offset of 160, and data 622 in bits 0-31 with a bit offset of greater than 160, such as up to 196 or more.

Now referring to FIG. 6B, a detailed view of the reserve field 612 is shown according to one embodiment. The reserve field 612 may be used for the storage of any specific information that does not have another dedicated field with which to store it, and as would be understood by a device which received a packet having specific information stored therein. If a receiving device, does not understand the information stored in the reserve field, then it may be disregarded and/or the packet may be dropped, in some instances. In one approach, the reserve field 612 may include TCP flags, such as a congestion window reduced (CWR) flag 630, an EN echo (ECE) flag 632, an urgent (URG) flag 634, an acknowledgement (ACK) flag 636, a push (PSH) flag 638, a reset (RST) flag 640, a synchronization for sequence numbers (SYN) flag 642, and a finish (FIN) flag 644, as would be known to one of skill in the art. Any amount of space in the reserve field 612 that is not used may be referred to as remaining reserve 624, which may be used for other purposes and/or to indicate other information not described herein (for future expansion or use).

In addition, in some approaches, the reserve field 612 may include a security (SEC) flag 626 and a security acknowledgement (SAC) flag 628, as described, previously. The SEC flag 626 may be used to indicate a security issue with one or more TCP/UDP sessions and/or a security issue at a host or server peer to the device which is destined to receive a packet including the TCP header 600. For example, when the SEC flag 626 is set, it may indicate that one of the ends of the TCP/UDP session has determined that a security compromise or security problems have been identified, such as via security protection software and/or malware detection software, an intrusion prevention system (IPS), an intrusion detection system (IDS), etc., which may be embodied in the local threat detection module 528.

In another embodiment, the SAC flag 628 may be set to acknowledge the receipt of a packet identifying a security problem. By setting this bit, it is intended to signify to a receiving device that a proper corresponding action is being taken to address the security issue on the sending device's side of the TCP/UDP session.

Referring to FIGS. 64-6B, the options field 620 may be used to signify certain aspects of the security issue when the SEC flag 626 is set. For example, the options field 620 may be used to indicate a level of security breach, such as by using a TLV that is recognized as representing security related information. In addition, in some approaches, miscellaneous information may be provided with the new security-based TLV in the options field 620.

In one approach, the TLV values may be used to indicate a severity of a security issue, with higher TLV values indicating a more severe security issue, and lower TLV values indicating a less severe security issue, or vice versa. In some instances, a TLV value below a threshold may be ignored, while TLV values at or above the threshold may indicate a more severe security issue and may be indicated to peers in the one or more TCP/UDP sessions.

In another embodiment, the options field 620 may be used to signify certain aspects of the security issue when the SAC flag 628 is set, such as identifying one or more actions that have been taken in response to the security issue being relayed to a peer device.

In an additional embodiment, a handshake operation, as known in the art, may take place between peers in the one or more TCP/UDP sessions to establish TLV values that may be used, and what each TLV value represents for a level of the security issue. This handshake and setting of usable TLV values may take place for each TCP stack, in one approach.

For an UDP session, according to one embodiment, a unique UDP packet may be sent to peers in a UDP session to indicate a security issue instead of relying on TLV values in a TCP header of a packet. In another embodiment, an indicator may be included at an end of the payload of a UDP packet in order to indicate a security issue, as long as enough space is available in the UDP packet. Of course, other possible methods of informing about a security issue may be used in UDP packets, as would be understood by one of skill in the art upon reading the present descriptions.

As described previously, one or more actions may be taken in response to a security issue being identified on a peer device. One such action may include a TCP reset, were the TCP socket is closed and/or reset. Another action may include a UDP reset, where the UDP socket is closed and/or reset. Another action may include re-authenticating and resetting a secure sockets layer (SSL) virtual private network (VPN) which is being utilized for the TCP/UDP session(s). According to another action, a predetermined amount of time may be waited to determine whether the security issue may be worked out through some other action on the network. After this predetermined amount of time, such as 1 msec, 5 msec, 10 msec, ½ sec, 1 sec, etc., should the security issue not be resolved, some other action may be taken.

Another suitable action may be application specific, as each application may have a set of actions available for use in case of a security issue being encountered, and one of these actions may be taken depending on the severity of the security issue, as would be understood by one of skill in the art upon reading the present descriptions.

In another embodiment, only non-confidential fields of the query may be sent, thereby protecting the confidential information that would normally have been sent. In order for this action to be effective, the non-confidential fields (or conversely the confidential fields) are identified in the secure transmissions, thereby allowing only the non-confidential fields to be transmitted. Of course, this action does not allow for confidential information to be sent, but in some instances, the transmission of the non-confidential fields may be sufficient. In a further embodiment, no credit card numbers, bank account numbers, social security numbers, or any other sensitive account information may be sent.

According to another embodiment, in case a device fails to receive an acknowledgement (such as a SAC flag being set) to its identification of a security issue (such as by using the SEC flag), or a time-out is reached prior to receiving the acknowledgement, the TCP socket may be reset and closed, thereby preventing further security breaches.

In another embodiment, depending on the severity or level of the security issue, an appropriate action may be to do nothing extraordinary, as the security issue may not be indicative of an issue which concerns either peer in the TCP/UDP session(s). Of course, this determination may be made automatically, or may be presented to a user to make the decision. A TLV value below a threshold may be ignored, while TLV values at or above the threshold may indicate a more severe security issue.

Of course, any other suitable actions may be taken as would be known by one of skill in the art.

There are many possible sources of security issues. A non-exhaustive list may include: a local firewall appliance and/or virtual appliance, an IPS appliance (local or remote), an IDS appliance (local or remote), an application registry monitor (local or remote, a Total Security Protection System (e.g., End Point Protection by Symantec, etc.), etc.

Figure 7:
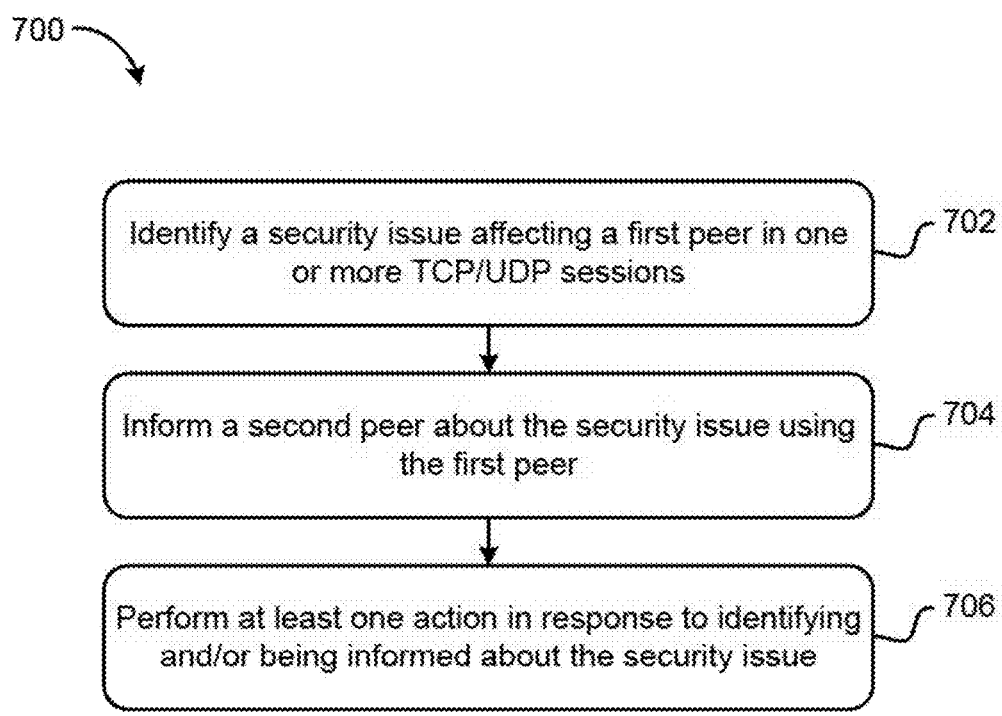
FIG. 7 is a flowchart of a method, according to one embodiment.

Now referring to FIG. 7, a method 700 for providing a secure TCP/UDP session is shown according to one embodiment. The method 700 may be performed in accordance with the present invention in any of the environments depicted in FIGS. 1-6B, among others, in various embodiments. Of course, more or less operations than those specifically described in FIG. 7 may be included in method 700, as would be understood by one of skill in the art upon reading the present descriptions.

Each of the steps of the method 700 may be performed by any suitable component of the operating environment. For example, in one embodiment, the method 700 may be partially or entirely performed by a host, a server, one or more vSwitches hosted by one or more servers, a router, a switch, a switch controller (such as a SDN controller, OpenFlow controller, etc.), a processor, e.g., a CPU, an application specific integrated circuit (ASIC), a field programmable gate array (FPGA), etc., one or more network interface cards (NICs), one or more virtual NICs, one more virtualization platforms, or any other suitable device or component of a network system or cluster.

In operation 702, a security issue affecting a first peer in one or more secure TCP/UDP sessions is identified, using any technique known in the art capable of identifying security issues.

In operation 704, a second peer is informed about the security issue using the first peer. In one embodiment, the first peer may send a packet to the second peer, the packet comprising an indication of the security issue.

In a further embodiment, the packet may include a TCP header, the TCP header comprising a source port, a destination port, and a security flag set to indicate a security issue at the first peer. This may be a simple bit flag which, when flipped from a 0 to a 1, or vice versa, indicates that a security issue has been detected. This security flag being set may cause the second peer to examine other portions of the packet to determine a severity of the security issue, in one approach.

In a further embodiment, the TCP header may also include one or more TLV elements configured to indicate a severity of the security issue. In one approach, the TLV element may be a multi-bit identifier, which has a predefined meaning, such that indicating a certain value with the TLV element may indicate a level of security breach, a type of security issue, or any other useful or usable information concerning the security issue.

In one embodiment, the security flag, may be stored within a reserve field of the TCP header. Furthermore, according to one embodiment, the one or more TLV elements may be stored within an options field of the TCP header.

In this way, a TCP stack of a peer which receives the indication of the security issue may respond to the security issue almost immediately, through use of the TCP state machine, to provide an extremely fast response to the security issue, thereby maintaining security of the one or more TCP/UDP sessions.

In operation 706, at least one action is performed in response to identifying and/or being informed about the security issue. This at least one action may be performed at the first peer and/or the second peer to resolve and/or avoid the security issue.

Any action known in the art may be performed, such as resetting and closing any TCP/UDP sockets affected by the security issue, re-authenticating and resetting the one or more TCP/UDP sessions affected by the security issue, waiting for a predetermined amount of time for the security issue to be resolved, adjusting a type of information exchanged across the one or more TCR/UDP sessions, and performing no extraordinary action, etc.

In a further embodiment, method 700 may include establishing the one or more TCP/UDP sessions between a server and a client which are peers on the one or more TCP/UDP sessions.

In another embodiment, method 700 may include informing the first peer that the security issue has been acknowledged by the second peer. Method 700 may include informing the first peer that the security issue has been acknowledged by the second peer by sending a second packet from the second peer to the first peer, the second packet comprising a TCP header having a security acknowledgement flag set therein to indicate that the security issue has been acknowledged by the second peer, according to one embodiment.

In a further embodiment, the security acknowledgement flag may be stored within a reserve field of the TCP header, similar to the security flag described previously.

Also, in one approach, the at least one action may be performed at the second peer to resolve and/or avoid the security issue.

In various other embodiments, some or all operations of method 700 may be implemented in a system with logic, a computer program product using program code, or some other implementation that would be known by one of skill in the art upon reading the present descriptions.

In an exemplary embodiment, a system comprises a processor (e.g., a CPU, an ASIC, a FPGA, etc.) and logic (hardware, software, or a combination thereof) integrated with and/or executable by the processor. The logic may be configured to cause the execution of some or all operations of method 700.

In another exemplary embodiment, a computer program product may comprise a computer readable storage medium having program code embodied therewith, the program code readable/executable by a device (e.g., a computer, a processor, a switch, a router, a processing circuit, etc.) to cause the execution of some or all operations of method 700.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A system, comprising a processor and logic integrated with and/or executable by the processor, the logic being configured to:
   identify a security issue affecting a first peer in one or more secure transmission control protocol/user datagram protocol (TCP/UDP) sessions;
   inform a second peer about the security issue using the first peer of the one or more TCP/UDP sessions by causing the first peer to send a packet from the first peer to the second peer, the first peer being aware of the security issue prior to informing the second peer about the security issue, and the packet comprising an indication of the security issue in a TCP header of the packet;
   receive a second packet at the first peer indicating that the security issue has been acknowledged by the second peer, the second packet comprising a second TCP header having a security acknowledgement flag set therein to indicate that the security issue has been acknowledged by the second peer, wherein the security acknowledgement flag is stored within a reserve field of the second TCP header; and
   perform at least one action to resolve and/or avoid the security issue in response to identifying and/or being informed about the security issue at the first peer, the at least one action comprising informing, via a socket call or an extension of a socket call, one or more applications operating on the second peer via the one or more TCP/UDP sessions to limit information exchange based on a severity of the security issue.

2. The system as recited in claim 1, wherein the logic is further configured to establish the one or more TCP/UDP sessions between a server and a client which are peers on the one or more TCP/UDP sessions, and wherein the second peer is informed about the security issue on a per-session basis.

3. The system as recited in claim 1, wherein the second packet identifies one or more actions that have been taken in response to the security issue being relayed to the first.

4. The system as recited in claim 1, wherein the packet is sent from the first peer to the second peer within the one or more TCP/UDP sessions, and wherein the TCP header comprises:
   a source port;
   a destination port; and
   a security flag set to indicate the security issue at the first peer.

5. The system as recited in claim 4, wherein the security flag is stored within a reserve field of the TCP header.

6. The system as recited in claim 5, wherein the TCP header further comprises one or more type-length-value (TLV) elements indicating the severity of the security issue.

7. The system as recited in claim 6, wherein the one or more TLV elements are stored within an options field of the TCP header.

8. The system as recited in claim 1, wherein the at least one action is also performed at the second peer to resolve and/or avoid the security issue.

9. The system as recited in claim 1, wherein the logic is further configured to perform a handshake operation between the first peer and the second peer in the one or more TCP/UDP sessions to establish what level each TLV value represents for the security issue prior to informing the second peer about the security issue.

10. The system as recited in claim 9, wherein the security acknowledgement flag is stored within a reserve field of the second TCP header.

11. The system as recited in claim 1, wherein the first peer further performs one or more actions selected from a group consisting of: resetting and closing any TCP/UDP sockets affected by the security issue, re-authenticating and resetting the one or more TCP/UDP sessions affected by the security issue, waiting for a predetermined amount of time for the security issue to be resolved, adjusting a type of information exchanged across the one or more TCP/UDP sessions.

12. A method for providing a secure transmission control protocol/user datagram protocol (TCP/UDP) session, the method comprising:
identifying a security issue affecting a first peer in one or more TCP/UDP sessions;
informing a second peer about the security issue using the first peer of the one or more TCP/UDP sessions by causing the first peer to send a packet from the first peer to the second peer, the first peer being aware of the security issue prior to informing the second peer about the security issue, wherein the packet comprises one or more type-length-value (TLV) elements indicating a severity of the security issue, the one or more TLV elements being stored in a TCP header of the packet; and
performing at least one action in response to identifying and/or being informed about the security issue.

13. The method as recited in claim 12, further comprising establishing the one or more TCP/UDP sessions between a server and a client which are peers on the one or more TCP/UDP sessions, wherein the second peer is informed about the security issue on a per-session basis.

14. The method as recited in claim 12, further comprising informing the first peer that the security issue has been acknowledged by the second peer, wherein the at least one action is performed at the second peer to resolve and/or avoid the security issue.

15. The method as recited in claim 14, wherein the informing the first peer that the security issue has been acknowledged by the second peer comprises sending a second packet from the second peer to the first peer, the second packet comprising a second TCP header having a security acknowledgement flag set therein to indicate that the security issue has been acknowledged by the second peer, and wherein the security acknowledgement flag is stored within a reserve field of the second TCP header.

16. The method as recited in claim 15, wherein the second packet identifies one or more actions that have been taken in response to the security issue being relayed to the first peer.

17. The method as recited in claim 16, wherein the packet is sent from the first peer to the second peer within the one or more TCP/UDP sessions, and wherein the TCP header comprises:
a source port;
a destination port; and
a security flag set to indicate the security issue at the first peer.

18. The method as recited in claim 17, wherein the security flag is stored within a reserve field of the TCP header, wherein the one or more TLV elements are stored within an options field of the TCP header, and wherein the second peer is configured to inform, via a socket call or an extension of a socket call, one or more applications operating via the one or more TCP/UDP sessions to limit information exchange based on the severity of the security issue.

19. The method as recited in claim 12, wherein the at least one action is selected from a group consisting of: resetting and closing any TCP/UDP sockets affected by the security issue, re-authenticating and resetting the one or more TCP/UDP sessions affected by the security issue, waiting for a predetermined amount of time for the security issue to be resolved, adjusting a type of information exchanged across the one or more TCP/UDP sessions, and performing no extraordinary action.

20. A computer program product for providing a secure transmission control protocol/user datagram protocol (TCP/UDP) session, the computer program product comprising a non-transitory computer readable storage medium having program code embodied therewith, the program code readable/executable by a processor to:
identify, using the processor, a security issue affecting a first peer in one or more TCP/UDP sessions;
inform, using the processor, a second peer about the security issue by causing the first peer to send a packet from the first peer to the second peer, the first peer being aware of the security issue prior to informing the second peer about the security issue, and the packet comprising an indication of the security issue in a TCP header of the packet;
receive, using the processor, a packet at the first peer indicating that the security issue has been acknowledged by the second peer, the packet comprising a TCP header having a security acknowledgement flag set therein to indicate that the security issue has been acknowledged by the second peer, wherein the security acknowledgement flag is stored within a reserve field of the TCP header; and
perform, using the processor, at least one action to resolve and/or avoid the security issue in response to identifying and/or being informed about the security issue at the first peer and/or the second peer, the at least one action comprising informing, via a socket call or an extension of a socket call, one or more applications operating on the second peer via the one or more TCP/UDP sessions to limit information exchange based on a severity of the security issue.

* * * * *